US010207650B1

(12) United States Patent
Banegas

(10) Patent No.: US 10,207,650 B1
(45) Date of Patent: Feb. 19, 2019

(54) ADJUSTABLE UTILITY RACK FOR TRUCKS

(71) Applicant: Arnold Banegas, Conroe, TX (US)

(72) Inventor: Arnold Banegas, Conroe, TX (US)

( * ) Notice: Subject to any disclaimer, the term of this patent is extended or adjusted under 35 U.S.C. 154(b) by 0 days.

(21) Appl. No.: 15/818,987

(22) Filed: Nov. 21, 2017

(51) Int. Cl.
*B60R 9/06* (2006.01)
*B62D 33/02* (2006.01)

(52) U.S. Cl.
CPC ............ *B60R 9/06* (2013.01); *B62D 33/0207* (2013.01)

(58) Field of Classification Search
CPC ... B60R 9/00; B60R 9/06; B60R 9/045; B60P 3/00
USPC ...................................... 296/3; 224/405, 319
See application file for complete search history.

(56) References Cited

U.S. PATENT DOCUMENTS

| 2,720,414 | A | * | 10/1955 | Hart ........................ B62D 33/08 |
| | | | | 211/182 |
| 2,947,566 | A | * | 8/1960 | Tower ....................... B60P 3/42 |
| | | | | 211/182 |
| 4,398,763 | A | * | 8/1983 | Louw ...................... B62D 33/02 |
| | | | | 224/309 |
| 4,423,899 | A | | 1/1984 | Langmead |
| 5,037,152 | A | | 8/1991 | Hendricks |
| 5,494,327 | A | | 2/1996 | Derecktor |
| D444,446 | S | | 7/2001 | Carter |
| 6,347,731 | B1 | * | 2/2002 | Burger ...................... B60R 9/00 |
| | | | | 224/402 |
| 7,296,836 | B1 | * | 11/2007 | Sabo ........................ B60P 3/40 |
| | | | | 296/3 |
| 7,296,837 | B2 | | 11/2007 | Niedziela |
| 7,419,075 | B2 | | 9/2008 | Green |
| 7,497,493 | B1 | | 3/2009 | Thiessen |
| 7,641,251 | B1 | * | 1/2010 | Stepanians ................ B60P 3/40 |
| | | | | 224/405 |
| 7,758,091 | B1 | * | 7/2010 | McCall ..................... B60P 3/40 |
| | | | | 224/405 |
| 8,668,125 | B2 | | 3/2014 | Williams |
| 2005/0023314 | A1 | * | 2/2005 | Williams .................. B60P 3/40 |
| | | | | 224/405 |
| 2013/0229025 | A1 | * | 9/2013 | Johnasen .................. B60P 3/00 |
| | | | | 296/3 |
| 2014/0191527 | A1 | * | 7/2014 | Riley ........................ B60R 9/00 |
| | | | | 296/3 |

(Continued)

FOREIGN PATENT DOCUMENTS

CA          1218968          3/1987

*Primary Examiner* — Justin Larson
(74) *Attorney, Agent, or Firm* — Kyle A. Fletcher, Esq.

(57) ABSTRACT

The adjustable utility rack for trucks is a structure that removably attaches to a vehicle commonly referred to as a pickup truck. The adjustable utility rack for trucks creates a raised horizontal platform that is configured for use in carrying cargo. The dimensions of the adjustable utility rack for trucks are adjustable in the lateral, sagittal, and vertical directions such that the adjustable utility rack for trucks can be adjusted for both the dimensions of the pickup truck and the dimensions of the cargo. The adjustable utility rack for trucks comprises a plurality of sagittal rails, a plurality of lateral rails and a pedestal structure. The plurality of sagittal rails and the plurality of lateral rails support the transported cargo. The pedestal structure attaches the plurality of sagittal rails and the plurality of lateral rails to the pickup truck.

20 Claims, 9 Drawing Sheets

(56) References Cited

U.S. PATENT DOCUMENTS

2014/0197653 A1\* 7/2014 Stepanians ................ B60R 9/00
296/3

\* cited by examiner

ADJUSTABLE UTILITY RACK FOR TRUCKS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation, more specifically, an accessory configured for use as a cargo rack on a vehicle

SUMMARY OF INVENTION

The adjustable utility rack for trucks is a structure that removably attaches to a vehicle commonly referred to as a pickup truck. The pickup truck is further defined with a left sidewall and a right sidewall. The adjustable utility rack for trucks creates a raised horizontal platform that is configured for use in carrying cargo. The dimensions of the adjustable utility rack for trucks are adjustable in the lateral, sagittal, and vertical directions such that the adjustable utility rack for trucks can be adjusted for both the dimensions of the pickup rack for trucks comprises a plurality of sagittal rails, a plurality of lateral rails and a pedestal structure. The plurality of sagittal rails and the plurality of lateral rails support the transported cargo. The pedestal structure attaches the plurality of sagittal rails and the plurality of lateral rails to the pickup truck.

These together with additional objects, features and advantages of the adjustable utility rack for trucks will be readily apparent to those of ordinary skill in the art upon reading the following detailed description of the presently preferred, but nonetheless illustrative, embodiments when taken in conjunction with the accompanying drawings.

In this respect, before explaining the current embodiments of the adjustable utility rack for trucks in detail, it is to be understood that the adjustable utility rack for trucks is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the adjustable utility rack for trucks.

It is therefore important that the claims be regarded as including such equivalent construction insofar as they do not depart from the spirit and scope of the adjustable utility rack for trucks. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
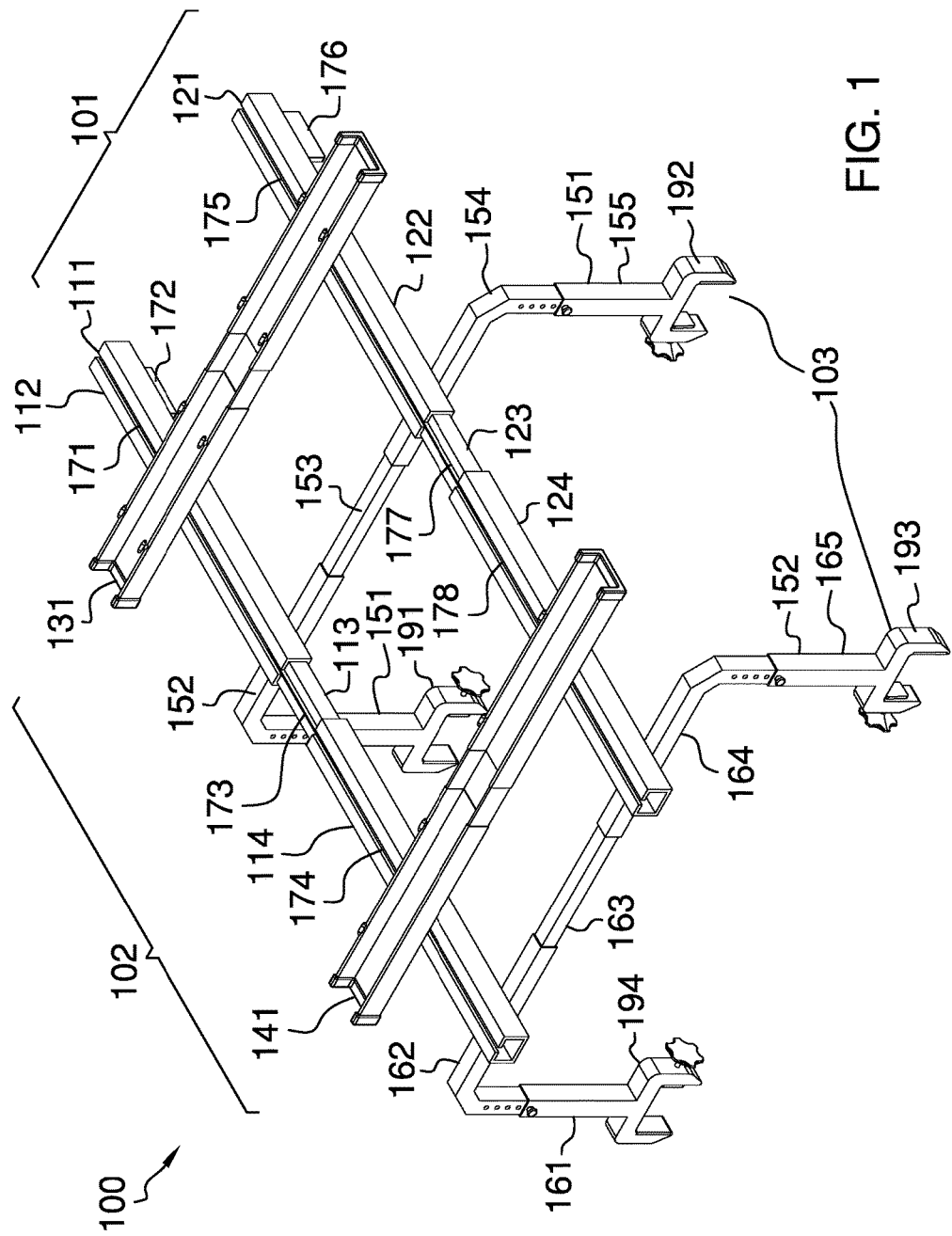
FIG. 1 is a perspective view of an embodiment of the disclosure.
Figure 2:
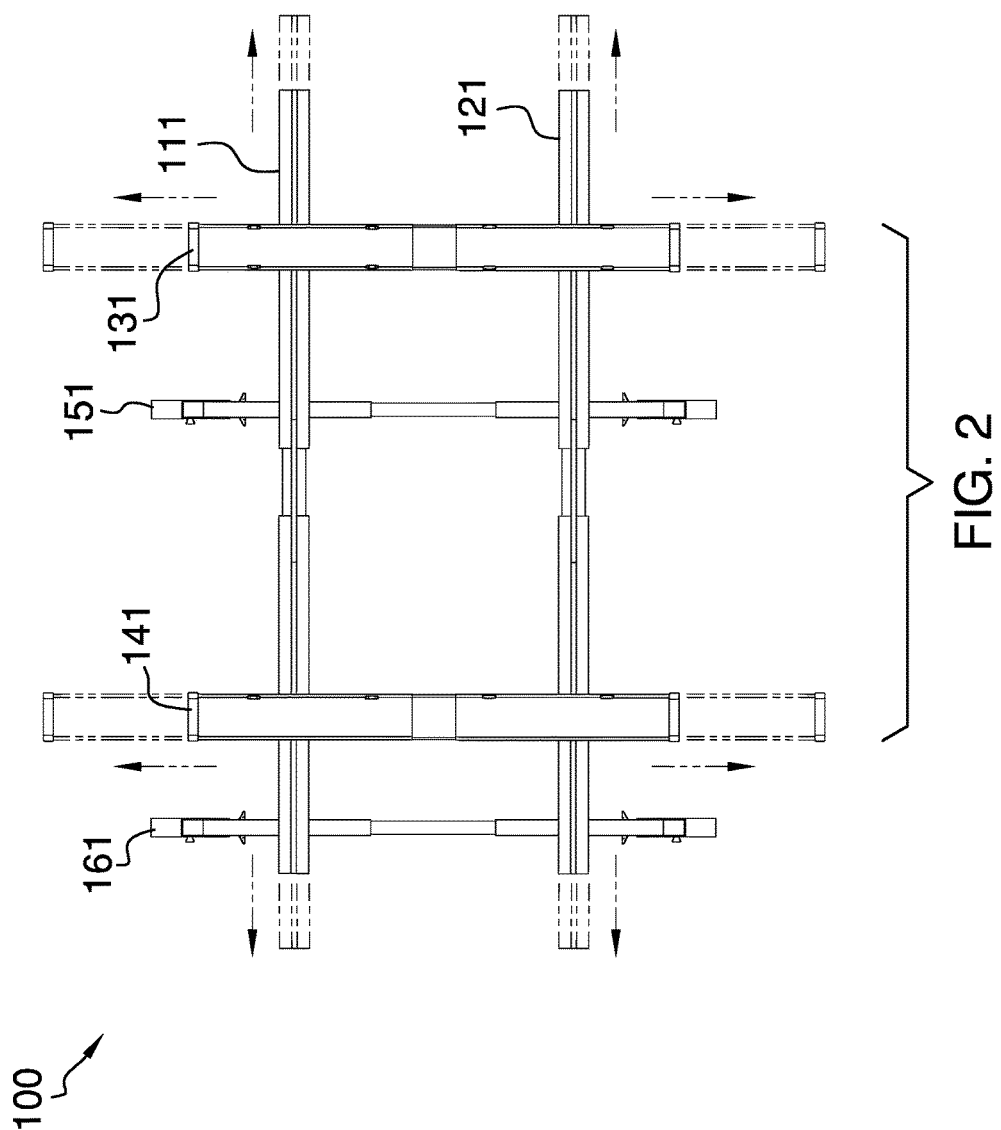
FIG. 2 is a superior view of an embodiment of the disclosure.
Figure 3:
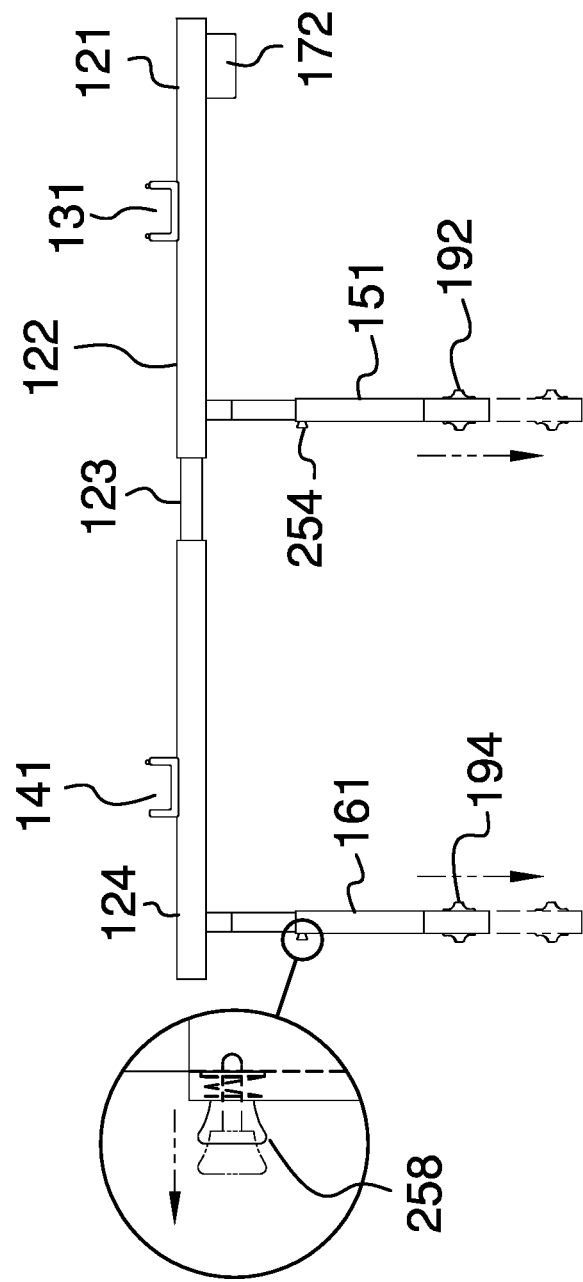
FIG. 3 is a side view of an embodiment of the disclosure.
Figure 4:
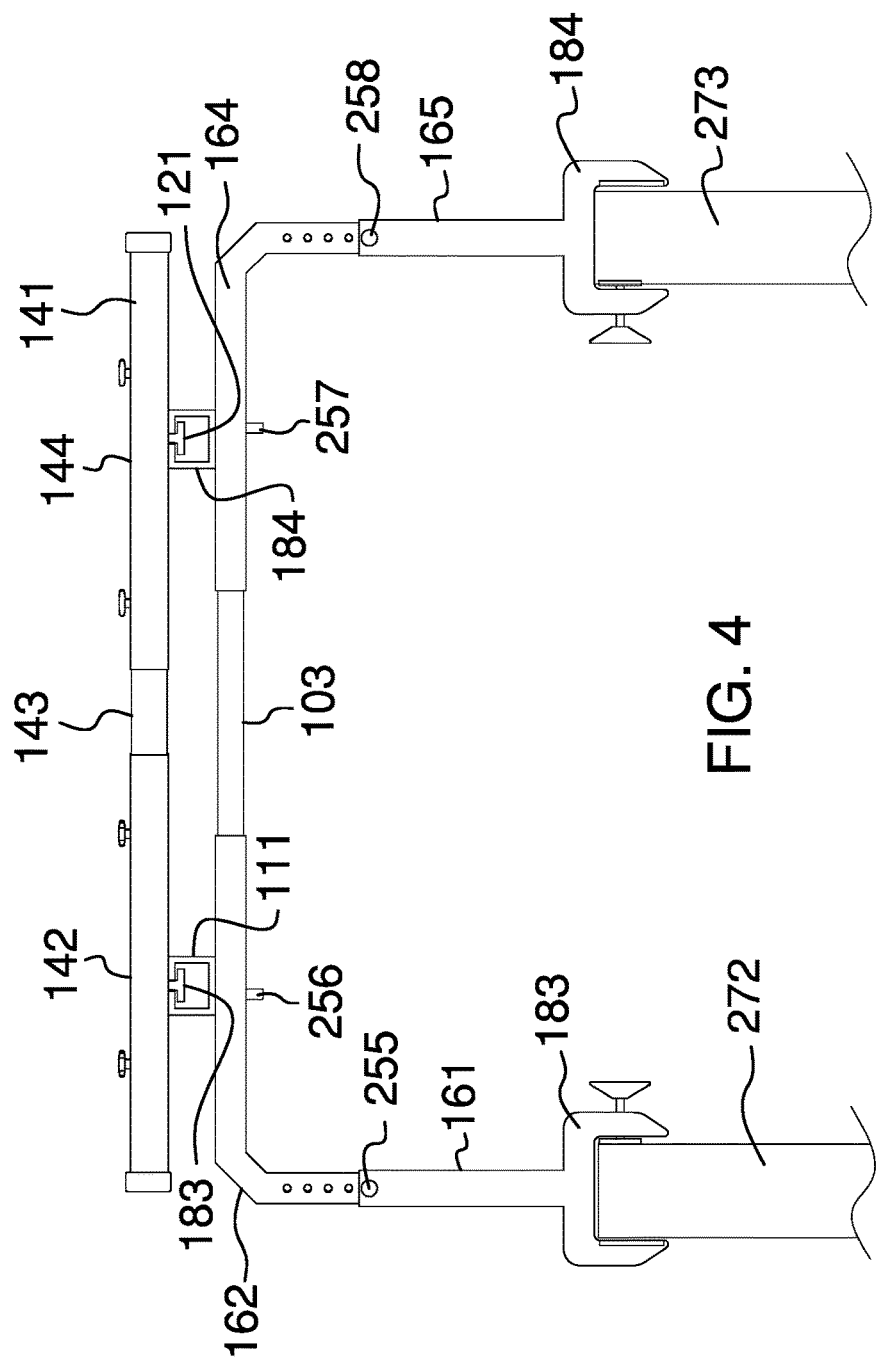
FIG. 4 is a posterior view of an embodiment of the disclosure.
Figure 5:
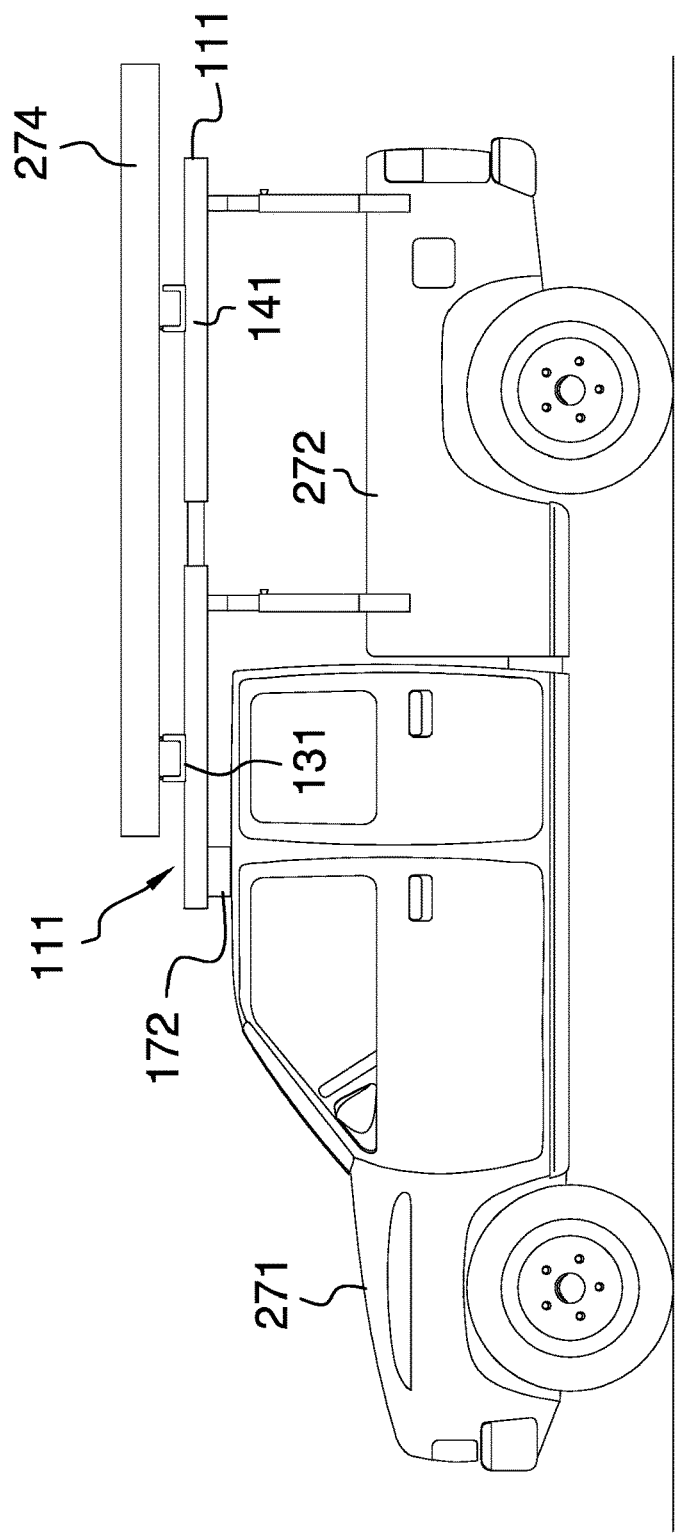
FIG. 5 is an in use view of an embodiment of the disclosure.
Figure 6:
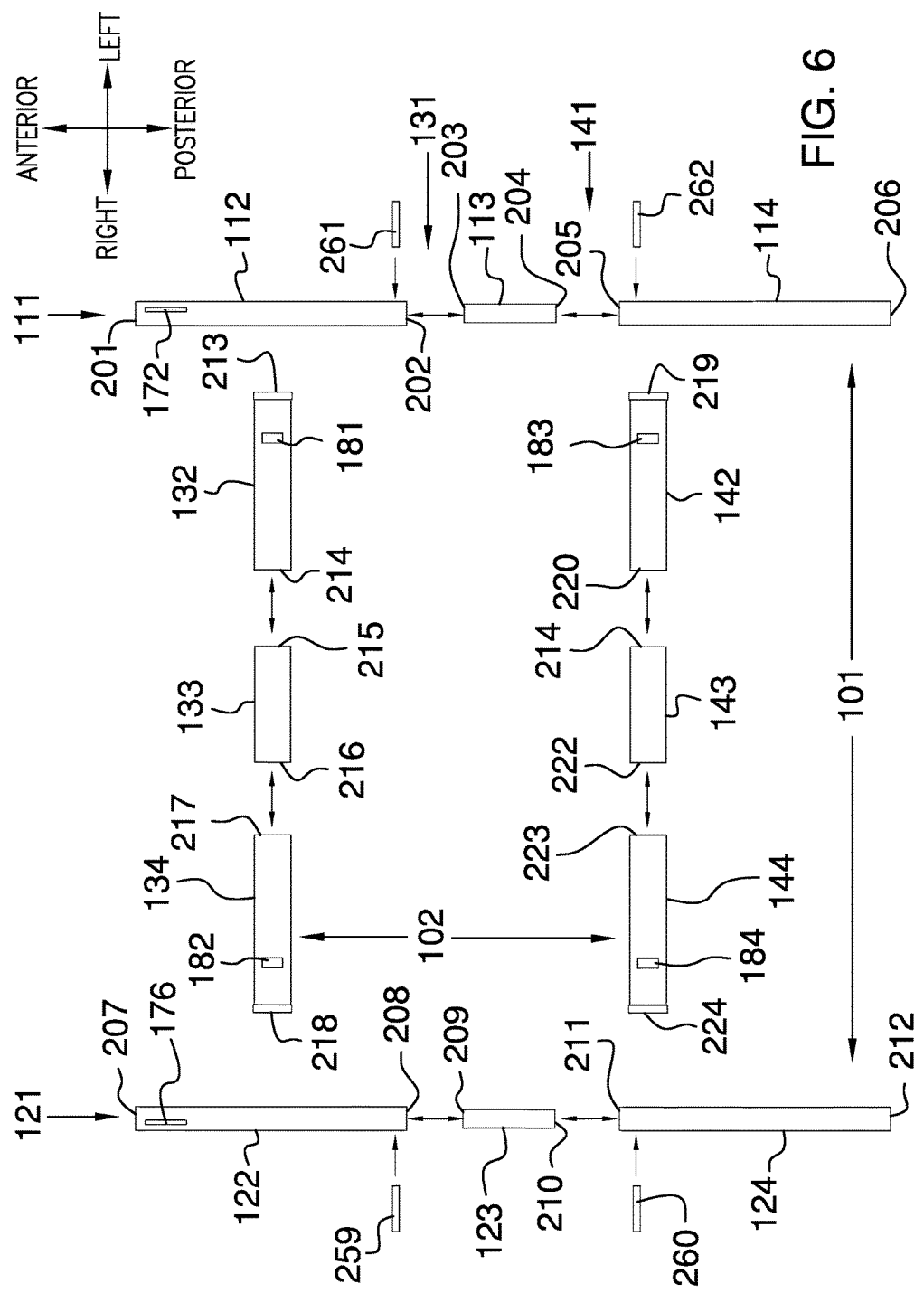
FIG. 6 is an exploded inferior view of an embodiment of the disclosure.
Figure 7:
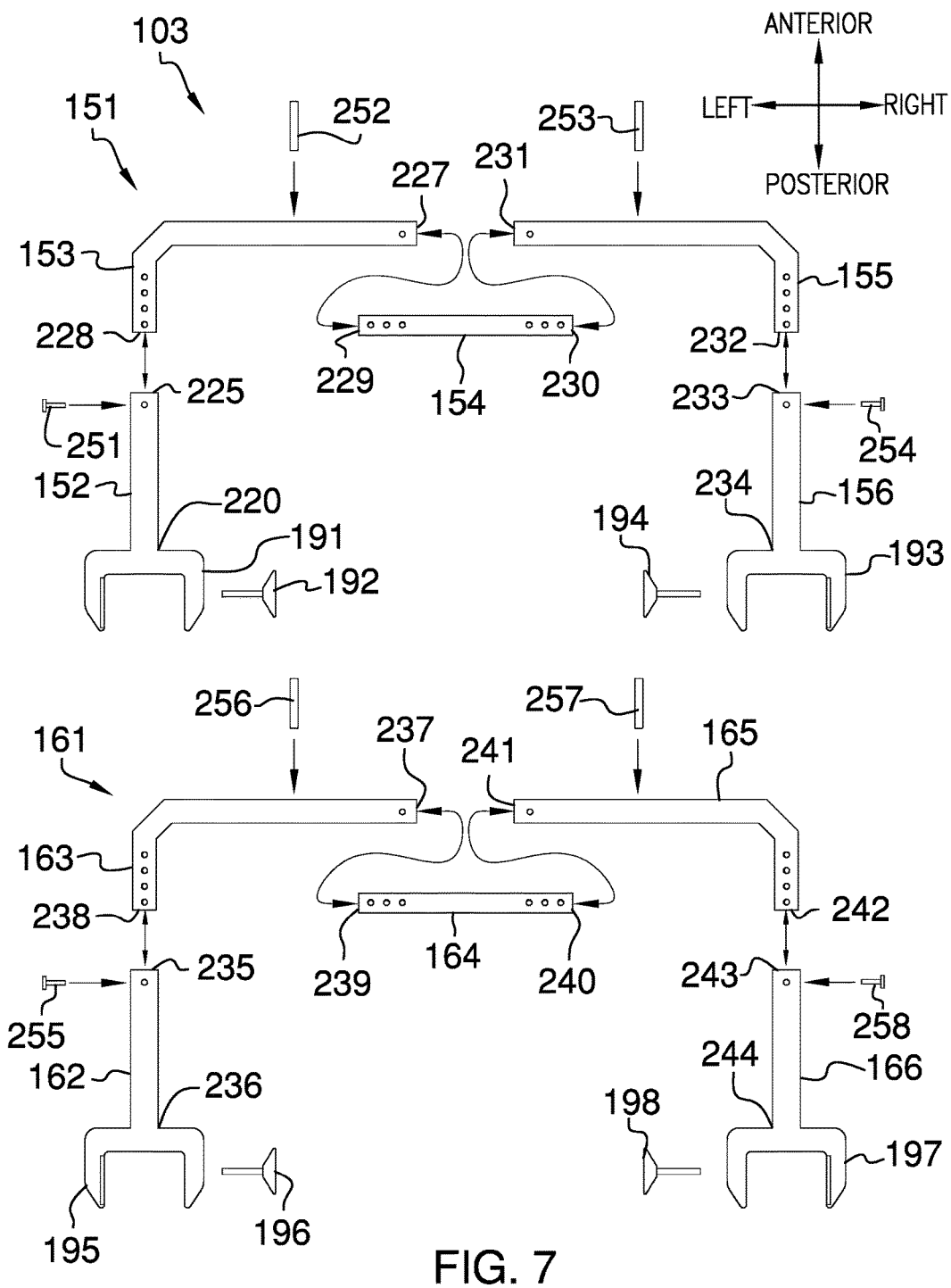
FIG. 7 is an exploded detail view of an embodiment of the disclosure.
Figure 8:
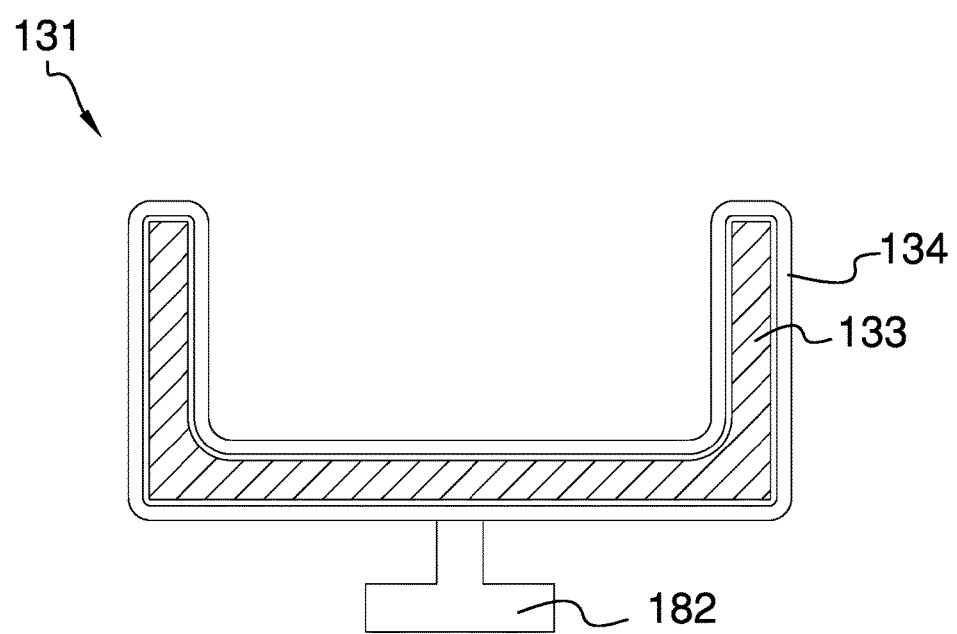
FIG. 8 is a detail view of an embodiment of the disclosure.
Figure 9:
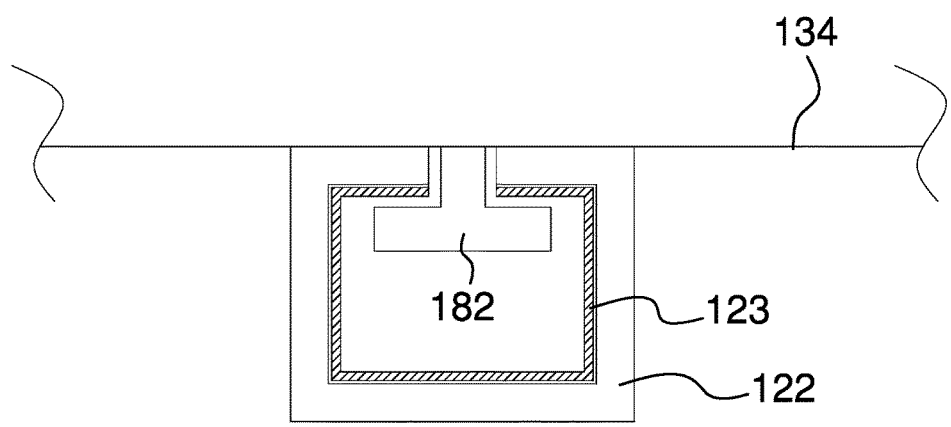
FIG. 9 is a detail view of an embodiment of the disclosure.

Detailed reference will now be made to one or more potential embodiments of the disclosure, which are illustrated in FIGS. 1 through 9.

The adjustable utility rack for trucks 100 (hereinafter invention) is a structure that removably attaches to a vehicle commonly referred to as a pickup truck 271. The pickup truck 271 is further defined with a left sidewall 272 and a right sidewall 273. The invention 100 creates a raised horizontal platform that is configured for use in carrying cargo 274. The dimensions of the invention 100 are adjustable in the lateral, sagittal, and vertical directions such that the invention 100 can be adjusted for both the dimensions of the pickup truck 271 and the dimensions of the cargo 274. The invention 100 comprises a plurality of sagittal rails 101, a plurality of lateral rails 102 and a pedestal structure 103. The plurality of sagittal rails 101 and the plurality of lateral rails 102 support the transported cargo 274. The pedestal structure 103 attaches the plurality of sagittal rails 101 and the plurality of lateral rails 102 to the pickup truck 271.

Each of the plurality of sagittal rails 101 is an apparatus that provides support for the cargo 274 along the direction of travel of the pickup truck 271. The plurality of sagittal rails 101 comprises a left sagittal rail 111 and a right sagittal rail 121.

The left sagittal rail 111 is the sagittal rail selected from the plurality of sagittal rails 101 that runs along the left side of the pickup truck 271. The left sagittal rail 111 comprises a left anterior tube 112, a left center tube 113, and a left posterior tube 114. The left anterior tube 112 further comprises a left anterior groove 171, a left cab pad 172, and an eleventh detent 261. The left center tube 113 further comprises a left center groove 173. The left posterior tube 114 further comprises a left posterior groove 174 and a twelfth detent 262. The left anterior tube 112 is further defined with a first end 201, a second end 202, and an inner dimension. The left center tube 113 is further defined with a third end 203, a fourth end 204, and an outer dimension. The left posterior tube 114 is further defined with a fifth end 205, a sixth end 206, and an inner dimension.

The left anterior tube 112 is a hollow metal tube formed in the shape of a regular prism. The left center tube 113 is a metal tube formed in the shape of a regular prism. The left posterior tube 114 is a hollow metal tube formed in the shape of a regular prism. The left anterior groove 171 is a slot formed in the left anterior tube 112. The left center groove 173 is a slot formed in the left center tube 113. The left posterior groove 174 is a slot formed in the left posterior tube 114. The left cab pad 172 is a protective pad attached the inferior surface of the left anterior tube 112 to protect the pickup truck 271.

The right sagittal rail 121 is the sagittal rail selected from the plurality of sagittal rails 101 that runs along the right side of the pickup truck 271. The right sagittal rail 121 comprises a right anterior tube 122, a right center tube 123, and a right posterior tube 124. The right anterior tube 122 further comprises a right anterior groove 175, a right cab pad 176, and a ninth detent 259. The right center tube 123 further comprises a right center groove 177. The right posterior tube 124 further comprises a right posterior groove 178 and a tenth detent 260. The right anterior tube 122 is further defined with a seventh end 207, an eighth end 208, and an inner dimension. The right center tube 123 is further defined with a ninth end 209, a tenth end 210, and an outer dimension. The right posterior tube 124 is further defined with an eleventh end 211, a twelfth end 212, and an inner dimension.

The right anterior tube 122 is a hollow metal tube formed in the shape of a regular prism. The right center tube 123 is a metal tube formed in the shape of a regular prism. The right posterior tube 124 is a hollow metal tube formed in the shape of a regular prism. The right anterior groove 175 is a slot formed in the right anterior tube 122. The right center groove 177 is a slot formed in the right center tube 123. The right posterior groove 178 is a slot formed in the right posterior tube 124. The right cab pad 176 is a protective pad attached the inferior surface of the right anterior tube 122 to protect the pickup truck 271.

The plurality of lateral rails 102 is an apparatus that provides support for the cargo 274 along the direction perpendicular to the direction of travel of the cargo 274. The plurality of lateral rails 102 attach to the plurality of sagittal rails 101. The plurality of lateral rails 102 comprises an anterior lateral rail 131 and a posterior lateral rail 141.

The anterior lateral rail 131 is the lateral rail selected from the plurality of lateral rails 102 that is proximal to the anterior side of the pickup truck 271. The anterior lateral rail 131 comprises an anterior left channel 132, an anterior center channel 133, and an anterior right channel 134. The anterior left channel 132 further comprises an anterior left anchor 181. The anterior right channel 134 further comprises an anterior right anchor 182. The anterior left channel 132 is further defined with a thirteenth end 213, a fourteenth end 214, and an inner dimension. The anterior center channel 133 is further defined with a fifteenth end 215, a sixteenth end 216, and an outer dimension. The anterior right channel 134 is further defined with a seventeenth end 217, an eighteenth end 218, and an inner dimension. The anterior left channel 132 is a hollow irregular metal prism structure. The anterior center channel 133 is a hollow irregular metal prism structure. The anterior right channel 134 is a hollow irregular metal prism structure.

The anterior left anchor 181 is a rectangular structure that projects away from the inferior surface of the anterior left channel 132. The anterior left anchor 181 attaches the anterior left channel 132 to the left anterior tube 112. The anterior right anchor 182 is a rectangular structure that projects away from the inferior surface of the anterior right channel 134. The anterior right anchor 182 attaches the anterior right channel 134 to the right anterior tube 122.

The posterior lateral rail 141 is the lateral rail selected from the plurality of lateral rails 102 that is proximal to the posterior side of the pickup truck 271. The posterior lateral rail 141 comprises a posterior left channel 142, a posterior center channel 143, and a posterior right channel 144. The posterior left channel 142 further comprises a posterior left anchor 183. The posterior right channel 144 further comprises a posterior right anchor 184. The posterior left channel 142 is further defined with a nineteenth end 219, a twentieth end 220, and an inner dimension. The posterior center channel 143 is further defined with a twenty-first end 221, a twenty-second end 222, and an outer dimension. The posterior right channel 144 is further defined with a twenty-third end 223, a twenty-fourth end 224, and an inner dimension. The posterior left channel 142 is a hollow irregular metal prism structure. The posterior center channel 143 is a hollow irregular metal prism structure. The posterior right channel 144 is a hollow irregular metal prism structure.

The posterior left anchor 183 is a rectangular structure that projects away from the inferior surface of the posterior left channel 142. The posterior left anchor 183 attaches the posterior left channel 142 to the left posterior tube 114. The posterior right anchor 184 is a rectangular structure that projects away from the inferior surface of the posterior right channel 144. The posterior right anchor 184 attaches the posterior right channel 144 to the right posterior tube 124.

The pedestal structure 103 is an apparatus that raises the plurality of sagittal rails 101 and that attaches to the left sidewall 272 and the right sidewall 273 of the pickup truck 271. The pedestal structure 103 comprises an anterior pedestal frame 151 and a posterior pedestal frame 161. The anterior pedestal frame 151 is a substructure of the pedestal structure 103 that is proximal to the anterior side of the pickup truck 271. The posterior pedestal frame 161 is a substructure of the pedestal structure 103 that is proximal to the anterior side of the pickup truck 271.

The anterior pedestal frame 151 comprises an anterior left clamp tube 152, an anterior left 90-degree elbow tube 153, an anterior center tube 154, an anterior right 90-degree elbow tube 155, and an anterior right clamp tube 156. The anterior left clamp tube 152 is further defined with a twenty-fifth end 225, a twenty-sixth end 226, and an inner dimension. The anterior left 90-degree elbow tube 153 is further defined with a twenty-seventh end 227, a twenty-eighth end 228, and an outer dimension. The anterior center tube 154 is further defined with a twenty-ninth end 229, a thirtieth end 230, and an inner dimension. The anterior right 90-degree elbow tube 155 is further defined with a thirty first end 231, a thirty second end 232, and an outer dimension.

The anterior right clamp tube 156 is further defined with a thirty-third end 233, a thirty-fourth end 234, and an inner dimension.

The anterior left clamp tube 152 further comprises a first detent 251. The anterior left 90-degree elbow tube 153 further comprises a second detent 252. The anterior right 90-degree elbow tube 155 further comprises a third detent 253. The anterior right clamp tube 156 further comprises a fourth detent 254.

The anterior left clamp tube 152 is a hollow square metal tube. The anterior left 90-degree elbow tube 153 is a 90-degree elbow fitting. The anterior center tube 154 is a hollow square metal tube. The anterior right 90-degree elbow tube 155 is a 90-degree elbow fitting. The anterior right clamp tube 156 is a square metal tube.

The posterior pedestal frame 161 comprises a posterior left clamp tube 162, a posterior left 90-degree elbow tube 163, a posterior center tube 164, a posterior right 90-degree elbow tube 165, and a posterior right clamp tube 166. The posterior left clamp tube 162 is further defined with a thirty-fifth end 235, a thirty-sixth end 236, and an inner dimension. The posterior left 90-degree elbow tube 163 is further defined with a thirty-seventh end 237, a thirty-eighth end 238, and an outer dimension. The posterior center tube 164 is further defined with a thirty-ninth end 239, a fortieth end 240, and an inner dimension. The posterior right 90-degree elbow tube 165 is further defined with a forty-first end 241, a forty-second end 242, and an outer dimension. The posterior right clamp tube 166 is further defined with a forty-third end 243, a forty-fourth end 244, and an inner dimension.

The posterior left clamp tube 162 further comprises a fifth detent 255. The posterior left 90-degree elbow tube 163 further comprises a sixth detent 256. The posterior right 90-degree elbow tube 165 further comprises a seventh detent 257. The posterior right clamp tube 166 further comprises an eighth detent 258.

The posterior left clamp tube 162 is a hollow square metal tube. The posterior left 90-degree elbow tube 163 is a 90-degree elbow fitting. The posterior center tube 164 is a square metal tube. The posterior right 90-degree elbow tube 165 is a 90-degree elbow fitting. The posterior right clamp tube 166 is a hollow square metal tube.

The anterior left U bracket 191 is a commercially available U bracket. The anterior left lock screw 192 is a commercially available hardware item. The anterior right U bracket 193 is a commercially available U bracket. The anterior right lock screw 194 is a commercially available hardware item. The posterior left U bracket 195 is a commercially available U bracket. The posterior left lock screw 196 is a commercially available hardware item. The posterior right U bracket 197 is a commercially available U bracket. The posterior right lock screw 198 is a commercially available hardware item.

The assembly of the plurality of sagittal rails 101 is described in the following nine paragraphs.

In the first potential embodiment of this disclosure, the left sagittal rail 111 and the right sagittal rail 121 are identical. Within this disclosure, the assembly of the left sagittal rail 111 will be described in detail with the understanding that the right sagittal rail 121 is assembled in the same way.

The left sagittal rail 111 is a telescopic structure.

The left anterior tube 112 is a hollow prism shaped structure. The left center tube 113 is a prism shaped structure. The left anterior tube 112 and the left center tube 113 are geometrically similar. The outer dimensions of the left center tube 113 are lesser than the inner dimensions of the left anterior tube 112 such that the left center tube 113 inserts into the left anterior tube 112 in a telescopic manner. This telescopic arrangement between the left anterior tube 112 and the left center tube 113 allows the span of the left sagittal rail 111 to be adjusted by adjusting the position of the left anterior tube 112 relative to the left center tube 113.

The position of the left anterior tube 112 relative to the left center tube 113 is held in position using the eleventh detent 261. The eleventh detent 261 is a spring loaded mechanical device that that locks the left anterior tube 112 and the left center tube 113 into fixed positions.

The left posterior tube 114 is a hollow prism shaped structure. The left center tube 113 is a prism shaped structure. The left posterior tube 114 and the left center tube 113 are geometrically similar. The outer dimensions of the left center tube 113 are lesser than the inner dimensions of the left posterior tube 114 such that the left center tube 113 inserts into the left posterior tube 114 in a telescopic manner. This telescopic arrangement between the left posterior tube 114 and the left center tube 113 allows the span of the left sagittal rail 111 to be adjusted by adjusting the position of the left posterior tube 114 relative to the left center tube 113.

The position of the left posterior tube 114 relative to the left center tube 113 is held in position using the twelfth detent 262. The twelfth detent 262 is a spring loaded mechanical device that that locks the left posterior tube 114 and the left center tube 113 into fixed positions.

In the first potential embodiment of this disclosure, the third end 203 of the left center tube 113 inserts into the second end 202 of the left anterior tube 112. The fourth end 204 of the left center tube 113 inserts into the fifth end 205 of the left posterior tube 114.

The assembly of the right sagittal rail 121 is identical to the assembly of the left sagittal rail 111. This paragraph and the next paragraph identify the part correspondences used for the assembly of the right sagittal rail 121. The right anterior tube 122 corresponds to the left anterior tube 112. The right center tube 123 corresponds to the left center tube 113. The right posterior tube 124 corresponds to the left posterior tube 114. The ninth detent 259 corresponds to the eleventh detent 261. The tenth detent 260 corresponds to the twelfth detent 262.

The first end 201 of the left anterior tube 112 corresponds to the seventh end 207 of the right anterior tube 122. The second end 202 of the left anterior tube 112 corresponds to the eighth end 208 of the right anterior tube 122. The third end 203 of the left center tube 113 corresponds to the ninth end 209 of the right center tube 123. The fourth end 204 of the left center tube 113 corresponds to the tenth end 210 of the right center tube 123. The fifth end 205 of the left posterior tube 114 corresponds to the eleventh end 211 of the right posterior tube 124. The sixth end 206 of the left posterior tube 114 corresponds to the twelfth end 212 of the right posterior tube 124.

The assembly of the plurality of lateral rails 102 is described in the following eight paragraphs.

In the first potential embodiment of this disclosure, the anterior lateral rail 131 and the posterior lateral rail 141 are identical. Within this disclosure, the assembly of the anterior lateral rail 131 will be described in detail with the understanding that the posterior lateral rail 141 is assembled in the same way.

The anterior lateral rail 131 is a telescopic structure. The anterior left channel 132 is a hollow irregular prism shaped structure. The anterior center channel 133 is an irregular prism shaped structure. The anterior left channel 132 and the anterior center channel 133 are geometrically similar. The outer dimensions of the anterior center channel 133 are lesser than the inner dimensions of the anterior left channel 132 such that the anterior center channel 133 inserts into the anterior left channel 132 in a telescopic manner. This telescopic arrangement between the anterior left channel 132 and the anterior center channel 133 allows the span of the anterior lateral rail 131 to be adjusted by adjusting the position of the anterior left channel 132 relative to the anterior center channel 133.

The anterior right channel 134 is a hollow irregular prism shaped structure. The anterior right channel 134 and the anterior center channel 133 are geometrically similar. The outer dimensions of the anterior center channel 133 are lesser than the inner dimensions of the anterior right channel 134 such that the anterior center channel 133 inserts into the anterior right channel 134 in a telescopic manner. This telescopic arrangement between the anterior right channel 134 and the anterior center channel 133 allows the span of the anterior lateral rail 131 to be adjusted by adjusting the position of the anterior right channel 134 relative to the anterior center channel 133.

The telescopic structure of the anterior lateral rail 131 does not require a detent. Instead, the anterior left channel 132 attaches to the left anterior tube 112 and the anterior right channel 134 attaches to the left posterior tube 114 to lock the anterior lateral rail 131. The locking of the span of the anterior lateral rail 131 is done by inserting the anterior left anchor 181 of the anterior left channel 132 into the left anterior groove 171 of the left anterior tube 112 in the manner of a T track fastener while simultaneously inserting the anterior right anchor 182 of the anterior right channel 134 into the right anterior groove 175 of the right anterior tube 122 in the manner of a T track fastener.

In the first potential embodiment of this disclosure, the fifteenth end 215 of the anterior center channel 133 inserts into the fourteenth end 214 of the anterior left channel 132. The sixteenth end 216 of the anterior center channel 133 inserts into the seventeenth end 217 of the anterior right channel 134.

The assembly of the posterior lateral rail 141 is identical to the assembly of the anterior lateral rail 131. This paragraph and the next paragraph identifies the part correspondences used for the assembly of the posterior lateral rail 141. The posterior left channel 142 corresponds to the anterior left channel 132. The posterior center channel 143 corresponds to the anterior center channel 133. The posterior right channel 144 corresponds to the anterior right channel 134. The left anterior groove 171 corresponds to the left posterior groove 174. The right anterior groove 175 corresponds to the right posterior groove 178. The anterior left anchor 181 corresponds to the posterior left anchor 183. The anterior right anchor 182 corresponds to the posterior right anchor 184.

Further, the thirteenth end 213 of the anterior left channel 132 corresponds to the nineteenth end 219 of the posterior left channel 142. The fourteenth end 214 of the anterior left channel 132 corresponds to the twentieth end 220 of the posterior left channel 142. The fifteenth end 215 of the anterior center channel 133 corresponds to the twenty-first end 221 of the posterior center channel 143. The sixteenth end 216 of the anterior center channel 133 corresponds to the twenty-second end 222 of the posterior center channel 143. The seventeenth end 217 of the anterior right channel 134 corresponds to the twenty-third end 223 of the posterior right channel 144. The eighteenth end 218 of the anterior right channel 134 corresponds to the twenty-fourth end 224 of the posterior right channel 144.

The assembly of the pedestal structure 103 is described in the following thirteen paragraphs.

In the first potential embodiment of this disclosure, the anterior pedestal frame 151 and the posterior pedestal frame 161 are identical. Within this disclosure, the assembly of the anterior pedestal frame 151 will be described in detail with the understanding that the posterior pedestal frame 161 is assembled in the same way.

The anterior left U bracket 191 attaches to the twenty-sixth end 226 of the anterior left clamp tube 152. The anterior right U bracket 193 attaches to the thirty-fourth end 234 of the anterior right clamp tube 156. The anterior left lock screw 192 screws into the anterior left U bracket 191 such that the anterior left U bracket 191 securely attaches to the left sidewall 272 of the pickup truck 271. The anterior right lock screw 194 screws into the anterior right U bracket 193 such that the anterior right U bracket 193 securely attaches to the right sidewall 273 of the pickup truck 271.

The anterior pedestal frame 151 is a telescopic structure. The anterior left clamp tube 152, the anterior center tube 154, and the anterior right clamp tube 156 are hollow prism shaped structures. The anterior left 90-degree elbow tube 153 and the anterior right 90-degree elbow tube 155 are readily and commercially available 90-degree elbow structures.

The anterior left clamp tube 152 and the twenty-eighth end 228 of the anterior left 90-degree elbow tube 153 are geometrically similar. The anterior center tube 154 and the twenty-seventh end 227 of the anterior left 90-degree elbow tube 153 are geometrically similar. The anterior center tube 154 and the thirty-first end 231 of the anterior right 90-degree elbow tube 155 are geometrically similar. The anterior right clamp tube 156 and the thirty-second end 232 of the anterior right 90-degree elbow tube 155 are geometrically similar.

The outer dimensions of the twenty-eighth end 228 of the anterior left 90-degree elbow tube 153 are lesser than the inner dimensions of the twenty-fifth end 225 of the anterior left clamp tube 152 such that the twenty-eighth end 228 inserts into the twenty-sixth end 226 of the anterior left clamp tube 152.

This telescopic arrangement between the anterior left clamp tube 152 and the anterior left 90-degree elbow tube 153 allows the vertical span of the anterior pedestal frame 151 to be adjusted by adjusting the position of the anterior left 90-degree elbow tube 153 relative to the anterior left clamp tube 152.

The outer dimensions of the twenty-seventh end 227 of the anterior left 90-degree elbow tube 153 are lesser than the inner dimensions of the twenty-ninth end 229 of the anterior center tube 154 such that the twenty-seventh end 227 inserts into the twenty-ninth end 229 of the anterior center tube 154. This telescopic arrangement between the anterior center tube 154 and the anterior left 90-degree elbow tube 153 allows the horizontal span of the anterior pedestal frame 151 to be adjusted by adjusting the position of the anterior left 90-degree elbow tube 153 relative to the anterior center tube 154.

The outer dimensions of the thirty-first end 231 of the anterior right 90-degree elbow tube 155 are lesser than the inner dimensions of the thirtieth end 230 of the anterior center tube 154 such that the thirty-first end 231 inserts into the thirtieth end 230 of the anterior center tube 154. This telescopic arrangement between the anterior right 90-degree elbow tube 155 and the anterior left 90-degree elbow tube 153 allows the horizontal span of the anterior pedestal frame 151 to be adjusted by adjusting the position of the anterior left 90-degree elbow tube 153 relative to the anterior right 90-degree elbow tube 155.

The outer dimensions of the thirty-second end 232 of the anterior right 90-degree elbow tube 155 are lesser than the inner dimensions of the anterior center channel 133 of the anterior right clamp tube 156 such that the thirty-second end 232 inserts into the thirty-third end 233 of the anterior right clamp tube 156. This telescopic arrangement between the anterior right clamp tube 156 and the anterior right 90-degree elbow tube 155 allows the vertical span of the anterior pedestal frame 151 to be adjusted by adjusting the position of the anterior right 90-degree elbow tube 155 relative to the anterior right clamp tube 156.

The first detent 251 is a spring loaded mechanical device that that locks the anterior left clamp tube 152 and the anterior left 90-degree elbow tube 153 into fixed positions. The second detent 252 is a spring loaded mechanical device that that locks the anterior left 90-degree elbow tube 153 and the anterior center tube 154 into fixed positions. The third detent 253 is a spring loaded mechanical device that that locks the anterior center tube 154 and the anterior right 90-degree elbow tube 155 into fixed positions. The fourth detent 254 is a spring loaded mechanical device that that locks the anterior right 90-degree elbow tube 155 and the anterior right clamp tube 156 into fixed positions.

The assembly of the posterior pedestal frame 161 is identical to the assembly of the anterior pedestal frame 151. This paragraph and the next paragraph identify the part correspondences used for the assembly of the posterior pedestal frame 161. The anterior left clamp tube 152 corresponds to the posterior left clamp tube 162. The anterior left 90-degree elbow tube 153 corresponds to the posterior left 90-degree elbow tube 163. The anterior center tube 154 corresponds to the posterior center tube 164. The anterior right 90-degree elbow tube 155 corresponds to the posterior right 90-degree elbow tube 165. The anterior right 90-degree elbow tube 155 corresponds to the anterior right clamp tube 156. The first detent 251 corresponds to the fifth detent 255. The second detent 252 corresponds to the sixth detent 256. The third detent 253 corresponds to the seventh detent 257. The fourth detent 254 corresponds to the eighth detent 258.

The twenty-fifth end 225 corresponds to the thirty-fifth end 235. The twenty-sixth end 226 corresponds to the thirty-sixth end 236. The twenty-seventh end 227 corresponds to the thirty-seventh end 237. The twenty-eighth end 228 corresponds to the thirty-eighth end 238. The twenty-ninth end 229 corresponds to the thirty-ninth end 239. The thirtieth end 230 corresponds to the fortieth end 240. The thirty-first end 231 corresponds to the forty-first end 241. The thirty-second end 232 corresponds to the forty-second end 242. The thirty-third end 233 corresponds to the forty-third end 243. The thirty-fourth end 234 corresponds to the forty-fourth end 244.

The following definitions and directional references were used in this disclosure:

90 Degree Elbow Tube: As used in this disclosure, a 90-degree elbow tube is a two aperture fitting that attaches a first pipe to a second pipe such that the center axis of the first pipe is perpendicular to the center axis of the second pipe.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anterior: As used in this disclosure, anterior is a term that is used to refer to the front side or direction of a structure. When comparing two objects, the anterior object is the object that is closer to the front of the structure.

Bracket: As used in this disclosure, a bracket is a mechanical structure that attaches a second structure to a first structure such that the load path of the second structure is fully transferred to the first structure.

Cargo: As used in this disclosure, cargo refers to one or more objects that are intended to be transported using a vehicle.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Correspond: As used in this disclosure, the term correspond means that a first object is in some manner linked to a second object in a one to one relationship.

Detent: As used in this disclosure, a detent is a device for positioning and holding a first object relative to a second object such that the position of the first object relative to the second object is adjustable.

Distal: As used in this disclosure, the term distal is used to describe the relative location of two objects. The distal object is: 1) the object that is further from a previously specified center axis when the direction of comparison is the radial direction; and 2) the object that is further from a center point on a center axis when the direction of comparison is in the lateral direction.

Geometrically Similar: As used in this disclosure, geometrically similar is a term that compares a first object to a second object wherein: 1) the sides of the first object have a one to one correspondence to the sides of the second object; 2) wherein there is a proportional difference between each pair of corresponding sides is the same; 3) the angles formed by the first object have a one to one correspondence to the angles of the second object; and, 4) wherein the corresponding angles are equal.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity.

Inner Dimension: As used in this disclosure, the term inner dimension describes the span from a first inside or interior surface of a container to a second inside or interior surface of a container. The term is used in much the same way that a plumber would refer to the inner diameter of a pipe.

Lateral: As used in this disclosure, the term lateral refers to the movement of an object that is perpendicular to the previously determined or expected direction of movement of the object. Lateral movement is always perpendicular to the anterior posterior axis.

Lateral Plane: As used in this disclosure, the lateral plane refers to a reference plane that bisects an anterior surface and posterior surface.

Load Path: As used in this disclosure, a load path refers to a chain of one or more structures that transfers a load generated by a raised structure or object to a foundation, supporting surface, or the earth.

Medial: As used in this disclosure, the term medial is used to describe the relative location of two objects. The medial object is: 1) the object that is closer to a previously specified center axis when the direction of comparison is the radial direction; and 2) the object that is closer to a center point on a center axis when the direction of comparison is in the lateral direction.

One to One: When used in this disclosure, a one to one relationship means that a first element selected from a first set is in some manner connected to only one element of a second set. A one to one correspondence means that the one to one relationship exists both from the first set the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pedestal: As used in this disclosure, a pedestal is an intermediary load bearing structure that is placed between a supporting surface and an object, structure, or load.

Pickup Truck: As used in this disclosure, a pickup truck is a vehicle having an enclosed cab and an open body comprising low sides and a tailgate that is powered by an internal combustion engine. A pickup truck is further defined with a bed, a tailgate, a left sidewall, and a right sidewall.

Posterior: As used in this disclosure, posterior is a term that is used to refer to the side of an object that is distal or in the opposite direction of the anterior side. When comparing two items, the posterior item is the item that is distal from the front of the object.

Prism: As used in this disclosure, a prism is a 3-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called that lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous the center axis of a cylinder. A prism wherein the ends are circles is commonly referred to as a cylinder.

Radial: As used in this disclosure, the term radial refers to a direction that: 1) is perpendicular to an identified central axis; or, 2) projects away from a center point.

T Track Fastener: As used in this disclosure, a T track fastener is a fastening device that is used to attach a first object to a second object by sliding the first object on to the second object. The T track fastener further comprises a tab and a channel. The tab is attached to the first object and the channel is attached to the second object such that the first object is attached to the second object when the tab is inserted into the channel.

Telescopic: As used in this disclosure, telescopic is an adjective that describes an object made of sections that fit or slide into each other such that the object can be made longer or shorter by adjusting the relative positions of the sections. Telescopic structures are held in position using a detent. Common and commercially available detents suitable for use with telescopic structures include, but are not limited to, a cotter pin, a G snap collar, a cam lock collar, a threaded clutch, a split collar lock, or a spring loaded ball lock.

Tube: As used in this disclosure, a tube is a hollow prism shaped device that is used for transporting liquids and gases. The line that connects the center of the first congruent face of the prism to the center of the second congruent face of the prism is referred to as the center axis of the tube or the centerline of the tube. When two tubes share the same centerline they are said to be aligned. When the centerlines of two tubes are perpendicular to each other, the tubes are said to be perpendicular to each other. In this disclosure, the terms inner dimensions of a tube and outer dimensions of a tube are used as they would be used by those skilled in the plumbing arts.

Sagittal Plane: As used in this disclosure, the sagittal plane refers to a plane that is perpendicular to the both the coronal (or lateral) plane and the transverse plane.

Superior: As used in this disclosure, the term superior refers to a directional reference that is parallel to and in the opposite direction of the force of gravity.

Vehicle: As used in this disclosure, a vehicle is a motorized device used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

The directional references used in this disclosure correspond to the directional references from the perspective of the vehicle. The anterior side is the side of the vehicle proximal to the normal direction of travel. The posterior side is the side of the vehicle that is distal from the front. The inferior side is the side of the vehicle that is closest to the ground. The superior side of the vehicle is the side of the vehicle that is distal to the inferior side. The left side is to the left side of a person facing the direction of normal, or forward travel. The right side is the side of the vehicle that is distal from the left side. The terms distal and medial refer to a hypothetical line drawn from the center point of the front axle to the center point of the rear axle. When comparing a first object to a second object, the first object is said to be the distal object if the span of the perpendicular distance from the first object the hypothetical line is greater than the span of the perpendicular distance from the second object to the hypothetical line. A first object is said to be the medial object if the span of the perpendicular distance from the first object the hypothetical line is less than the span of the perpendicular distance from the second object to the hypothetical line.

With respect to the above description, it is to be realized that the optimum dimensional relationship for the various components of the invention described above and in FIGS. 1 through 9 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A vehicle cargo rack comprising:
a plurality of sagittal rails, a plurality of lateral rails, and a pedestal structure;
wherein the plurality of sagittal rails and the plurality of lateral rails support transported cargo;
wherein the pedestal structure comprises an anterior pedestal frame and a posterior pedestal frame that each removably attach the plurality of sagittal rails to both aides of a truck bed;
wherein the plurality of sagittal rails attach atop the anterior and posterior pedestal frames;
wherein the plurality of lateral rails attach atop the plurality of sagittal rails;
wherein the vehicle cargo rack creates a raised horizontal platform;
wherein the horizontal platform is configured for use in transporting cargo;
wherein the dimensions of the vehicle cargo rack are adjustable in the lateral, sagittal; and vertical directions.
2. The vehicle cargo rack according to claim 1
wherein the plurality of sagittal rails comprises a left sagittal rail and a right sagittal rail;
wherein the left sagittal rail is a telescopic structure;
wherein the right sagittal rail is a telescopic structure;
wherein the left sagittal rail comprises a left anterior tube, a left center tube, and a left posterior tube;
wherein the left center tube attaches the left anterior tube to the left posterior tube;
wherein the left anterior tube, the left center tube, and the left posterior tube are geometrically similar;
wherein the right sagittal rail comprises a right anterior tube, a right center tube, and a right posterior tube;
wherein the right center tube attaches the right anterior tube to the right posterior tube;
wherein the right anterior tube, the right center tube, and the right posterior tube are geometrically similar;
wherein the left anterior tube is further defined with a first end, a second end, and an inner dimension;
wherein the left center tube is further defined with a third end, a fourth end, and an outer dimension;
wherein the left posterior tube is further defined with a fifth end, a sixth end, and an inner dimension;
wherein the right anterior tube is further defined with a seventh end, an eighth end, and an inner dimension;
wherein the right center tube is further defined with a ninth end, a tenth end, and an outer dimension;
wherein the right posterior tube is further defined with an eleventh end, a twelfth end, and an inner dimension.
3. The vehicle cargo rack according to claim 2
wherein the left anterior tube is a hollow metal tube formed in the shape of a regular prism;
wherein the left center tube is a metal tube formed in the shape of a regular prism;
wherein the left posterior tube is a hollow metal tube formed in the shape of a regular prism;
wherein the left anterior tube further comprises a left cab pad and an eleventh detent;
wherein the left cab pad is a protective pad.
4. The vehicle cargo rack according to claim 3
wherein the left anterior tube further comprises a left anterior groove;
wherein the left center tube further comprises a left center groove;
wherein the left posterior tube further comprises a left posterior groove and a twelfth detent;
wherein the left anterior groove is a slot formed in the left anterior tube;
wherein the left center groove is a slot formed in the left center tube;
wherein the left posterior groove is a slot formed in the left posterior tube.
5. The vehicle cargo rack according to claim 4
wherein the right anterior tube is a hollow metal tube formed in the shape of a regular prism;
wherein the right center tube is a metal tube formed in the shape of a regular prism;
wherein the right posterior tube is a hollow metal tube formed in the shape of a regular prism;
wherein the right anterior tube further comprises a right cab pad, and a ninth detent;
wherein the right cab pad is a protective pad.
6. The vehicle cargo rack according to claim 5
wherein the right anterior tube further comprises a right anterior groove;
wherein the right center tube further comprises a right center groove;
wherein the right posterior tube further comprises a right posterior groove and a tenth detent;
wherein the right anterior groove is a slot formed in the right anterior tube;
wherein the right center groove is a slot formed in the right center tube;
wherein the right posterior groove is a slot formed in the right posterior tube.
7. The vehicle cargo rack according to claim 6
wherein the plurality of lateral rails comprises an anterior lateral rail and a posterior lateral rail;
wherein the anterior lateral rail is a telescopic structure;
wherein the posterior lateral rail is a telescopic structure;
wherein the anterior lateral rail comprises an anterior left channel, an anterior center channel, and an anterior right channel;
wherein the anterior center channel attaches the anterior left channel to the anterior right channel;
wherein the posterior lateral rail comprises a posterior left channel, a posterior center channel, and a posterior right channel;

wherein the posterior center channel attaches the posterior left channel to the posterior right channel;
wherein the anterior left channel is further defined with a thirteenth end, a fourteenth end, and an inner dimension;
wherein the anterior center channel is further defined with a fifteenth end, a sixteenth end, and an outer dimension;
wherein the anterior right channel is further defined with a seventeenth end, an eighteenth end, and an inner dimension;
wherein the posterior left channel is further defined with a nineteenth end, a twentieth end, and an inner dimension;
wherein the posterior center channel is further defined with a twenty-first end, a twenty-second end, and an outer dimension;
wherein the posterior right channel is further defined with a twenty-third end, a twenty-fourth end, and an inner dimension.

8. The vehicle cargo rack according to claim 7
wherein the anterior left channel is a hollow irregular metal prism structure;
wherein the anterior center channel is an irregular metal prism structure;
wherein the anterior right channel is a hollow irregular metal prism structure;
wherein the posterior left channel is a hollow irregular metal prism structure;
wherein the posterior center channel is an irregular metal prism structure;
wherein the posterior right channel is a hollow irregular metal prism structure.

9. The vehicle cargo rack according to claim 8
wherein the anterior left channel further comprises an anterior left anchor;
wherein the anterior right channel further comprises an anterior right anchor;
wherein the posterior left channel further comprises a posterior left anchor;
wherein the posterior right channel further comprises a
wherein the anterior left anchor is a rectangular structure that projects away from the inferior surface of the anterior left channel;
wherein the anterior right anchor is a rectangular structure that projects away from the inferior surface of the anterior right channel;
wherein the posterior left anchor is a rectangular structure that projects away from the inferior surface of the posterior left channel;
wherein the posterior right anchor is a rectangular structure that projects away from the inferior surface of the posterior right channel;
wherein the anterior left anchor attaches the anterior left channel to the left anterior tube;
wherein the anterior right anchor attaches the anterior right channel to the right anterior tube.

10. The vehicle cargo rack according to claim 9
wherein the pedestal structure comprises an anterior pedestal frame and a posterior pedestal frame;
wherein the anterior pedestal frame is a telescopic structure;
wherein the posterior pedestal frame is a telescopic structure;
wherein the anterior pedestal frame is a first substructure of the pedestal structure that attaches to the pickup truck;
wherein the posterior pedestal frame is a second substructure of the pedestal structure that attaches to the pickup truck.

11. The vehicle cargo rack according to claim 10
wherein the anterior pedestal frame comprises an anterior left clamp tube, an anterior left 90-degree elbow tube, an anterior center tube, an anterior right 90-degree elbow tube, and an anterior right clamp tube;
wherein the anterior left clamp tube, the anterior left 90-degree elbow tube, the anterior center tube, the anterior right 90-degree elbow tube, and the anterior right clamp tube are interconnected to form the first substructure;
wherein the anterior left clamp tube is further defined with a twenty-fifth end, a twenty-sixth end, and an inner dimension;
wherein the anterior left 90-degree elbow tube is further defined with a twenty-seventh end, a twenty-eighth end, and an outer dimension;
wherein the anterior center tube is further defined with a twenty-ninth end, a thirtieth end, and an inner dimension;
wherein the anterior right 90-degree elbow tube is further defined with a thirty-first end, a thirty-second end, and an outer dimension;
wherein the anterior right clamp tube is further defined with a thirty-third end, a thirty-fourth end, and an inner dimension.

12. The vehicle cargo rack according to claim 11
wherein the posterior pedestal frame comprises a posterior left clamp tube, a posterior left 90-degree elbow tube, a posterior center tube, a posterior right 90-degree elbow tube, and a posterior right clamp tube;
wherein the posterior left clamp tube, the posterior left 90-degree elbow tube, the posterior center tube, the posterior right 90-degree elbow tube, and the posterior right clamp tube are interconnected to form the second substructure;
wherein the posterior left clamp tube is further defined with a thirty-fifth end, a thirty-sixth end, and an inner dimension;
wherein the posterior left 90-degree elbow tube is further defined with a thirty-seventh end, a thirty-eighth end, and an outer dimension;
wherein the posterior center tube is further defined with a thirty-ninth end, a fortieth end, and an inner dimension;
wherein the posterior right 90-degree elbow tube is further defined with a forty-first end, a forty-second end, and an outer dimension;
wherein the posterior right clamp tube is further defined with a forty-third end, a forty-fourth end, and an inner dimension.

13. The vehicle cargo rack according to claim 12
wherein the anterior left clamp tube further comprises a first detent;
wherein the anterior left 90-degree elbow tube further comprises a second detent;
wherein the anterior right 90-degree elbow tube further comprises a third detent;
wherein the anterior right clamp tube further comprises a fourth detent;
wherein the posterior left clamp tube further comprises a fifth detent;
wherein the posterior left 90-degree elbow tube further comprises a sixth detent;
wherein the posterior right 90-degree elbow tube further comprises a seventh detent;

wherein the posterior right clamp tube further comprises an eighth detent.

14. The vehicle cargo rack according to claim 13
wherein the anterior right clamp tube is a square metal tube;
wherein the anterior left clamp tube is a hollow square metal tube;
wherein the anterior left 90-degree elbow tube is a 90-degree elbow structure;
wherein the anterior center tube is a hollow square metal tube;
wherein the anterior right 90-degree elbow tube is a 90-degree elbow structure;
wherein the posterior left clamp tube is a hollow square metal tube;
wherein the posterior left 90-degree elbow tube is a 90-degree elbow structure;
wherein the posterior center tube is a square metal tube;
wherein the posterior right 90-degree elbow tube is a 90-degree elbow structure;
wherein the posterior right clamp tube is a hollow square metal tube.

15. The vehicle cargo rack according to claim 14
wherein the anterior left clamp tube further comprises an anterior left U bracket and an anterior left lock screw;
wherein the anterior right clamp tube further comprises an anterior right U bracket and an anterior right lock screw;
wherein the posterior left clamp tube further comprises a posterior left U bracket and a posterior left lock screw;
wherein the posterior right clamp tube further comprises a posterior right U bracket and a posterior right lock screw.

16. The vehicle cargo rack according to claim 15
wherein the left sagittal rail and the right sagittal rail are identical;
wherein the anterior lateral rail and the posterior lateral rail are identical;
wherein the anterior pedestal frame and the posterior pedestal frame are identical.

17. The vehicle cargo rack according to claim 16
wherein the outer dimensions of the left center tube are lesser than the inner dimensions of the left anterior tube such that the left center tube inserts into the left anterior tube telescopically;
wherein the position of the left anterior tube relative to the left center tube is held in position using the eleventh detent;
wherein the eleventh detent is a spring loaded mechanical device that that locks the left anterior tube and the left center tube into fixed positions;
wherein the outer dimensions of the left center tube are lesser than the inner dimensions of the left posterior tube such that the left center tube inserts into the left posterior tube telescopically;
wherein the position of the left posterior tube relative to the left center tube is held in position using the twelfth detent;
wherein the twelfth detent is a spring loaded mechanical device that that locks the left posterior tube and the left center tube into fixed positions;
wherein the assembly of the right sagittal rail is identical to the assembly of the left sagittal rail.

18. The vehicle cargo rack according to claim 17
wherein the outer dimensions of the anterior center channel are lesser than the inner dimensions of the anterior left channel such that the anterior center channel inserts into the anterior left channel telescopically;
wherein the outer dimensions of the anterior center channel are lesser than the inner dimensions of the anterior right channel such that the anterior center channel inserts into the anterior right channel telescopically;
wherein the anterior left channel attaches to the left anterior tube and the anterior right channel attaches to the left posterior tube to lock the anterior lateral rail;
wherein the anterior left anchor of the anterior left channel inserts into the left anterior groove of the left anterior tube while simultaneously inserting the anterior right anchor of the anterior right channel into the right anterior groove of the right anterior tube;
wherein in the first potential embodiment of this disclosure, the fifteenth end of the anterior center channel inserts into the fourteenth end of the anterior left channel;
wherein the sixteenth end of the anterior center channel inserts into the seventeenth end of the anterior right channel;
wherein the assembly of the posterior lateral rail is identical to the assembly of the anterior lateral rail.

19. The vehicle cargo rack according to claim 18
wherein the anterior left clamp tube and the twenty-eighth end of the anterior left 90-degree elbow tube are geometrically similar;
wherein the anterior center tube and the twenty-seventh end of the anterior left 90-degree elbow tube are geometrically similar;
wherein the anterior center tube and the thirty-first end of the anterior right 90-degree elbow tube are geometrically similar;
wherein the anterior right clamp tube and the thirty-second end of the anterior right 90-degree elbow tube are geometrically similar;
wherein the outer dimensions of the twenty-eighth end of the anterior left 90-degree elbow tube are lesser than the inner dimensions of the twenty-fifth end of the anterior left clamp tube such that the twenty-eighth end inserts into the twenty-sixth end of the anterior left clamp tube;
wherein the outer dimensions of the twenty-seventh end of the anterior left 90-degree elbow tube are lesser than the inner dimensions of the twenty-ninth end of the anterior center tube such that the twenty-seventh end inserts into the twenty-ninth end of the anterior center tube;
wherein the outer dimensions of the thirty-first end of the anterior right 90-degree elbow tube are lesser than the inner dimensions of the thirtieth end of the anterior center tube such that the thirty-first end inserts into the thirtieth end of the anterior center tube;
wherein the outer dimensions of the thirty-second end of the anterior right 90-degree elbow tube are lesser than the inner dimensions of the anterior center channel of the anterior right clamp tube such that the thirty-second end inserts into the thirty-third end of the anterior right clamp tube;
wherein the first detent is a spring loaded mechanical device that that locks the anterior left clamp tube and the anterior left 90-degree elbow tube into fixed positions;
wherein the second detent is a spring loaded mechanical device that that locks the anterior left 90-degree elbow tube and the anterior center tube into fixed positions;

wherein the third detent is a spring loaded mechanical device that that locks the anterior center tube and the anterior right 90-degree elbow tube into fixed positions;

wherein the fourth detent is a spring loaded mechanical device that that locks the anterior right 90-degree elbow tube and the anterior right clamp tube into fixed positions;

wherein the assembly of the posterior pedestal frame is identical to the assembly of the anterior pedestal frame;

wherein the anterior left clamp tube corresponds to the posterior left clamp tube;

wherein the anterior left 90-degree elbow tube corresponds to the posterior left 90-degree elbow tube;

wherein the anterior center tube corresponds to the posterior center tube;

wherein the anterior right 90-degree elbow tube corresponds to the posterior right 90-degree elbow tube;

wherein the anterior right 90-degree elbow tube corresponds to the anterior right clamp tube;

wherein the first detent corresponds to the fifth detent;

wherein the second detent corresponds to the sixth detent;

wherein the third detent corresponds to the seventh detent;

wherein the fourth detent corresponds to the eighth detent;

wherein the twenty-fifth end corresponds to the thirty-fifth end;

wherein the twenty-sixth end corresponds to the thirty-sixth end;

wherein the twenty-seventh end corresponds to the thirty-seventh end;

wherein the twenty-eighth end corresponds to the thirty-eighth end;

wherein the twenty-ninth end corresponds to the thirty-ninth end;

wherein the thirtieth end corresponds to the fortieth end;

wherein the thirty-first end corresponds to the forty-first end;

wherein the thirty-second end corresponds to the forty-second end;

wherein the thirty-third end corresponds to the forty-third end;

wherein the thirty-fourth end corresponds to the forty-fourth end.

20. The vehicle cargo rack according to claim 19 wherein the anterior left U bracket attaches to the twenty-sixth end of the anterior left clamp tube;

wherein the anterior right U bracket attaches to the thirty-fourth end of the anterior right clamp tube;

wherein the anterior left lock screw screws into the anterior left U bracket such that the anterior left U bracket securely attaches to the left sidewall of the pickup truck;

wherein the anterior right lock screw screws into the anterior right U bracket such that the anterior right U bracket securely attaches to the right sidewall of the pickup truck.

\* \* \* \* \*